(12) United States Patent
Shan

(10) Patent No.: US 11,879,645 B2
(45) Date of Patent: Jan. 23, 2024

(54) VENTILATION AND AIR CONDITIONING SYSTEM AND METHOD FOR REGULATING AIR OPENING

(71) Applicant: Beijing Xiaomi Mobile Software Co., Ltd., Beijing (CN)

(72) Inventor: Lianyu Shan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 717 days.

(21) Appl. No.: 17/062,959

(22) Filed: Oct. 5, 2020

(65) Prior Publication Data

US 2021/0318009 A1  Oct. 14, 2021

(30) Foreign Application Priority Data

Apr. 14, 2020 (CN) .......................... 202010291884.6

(51) Int. Cl.
| | |
|---|---|
| *F24F 11/00* | (2018.01) |
| *F24F 11/74* | (2018.01) |
| *F24F 7/06* | (2006.01) |
| *F24F 13/14* | (2006.01) |
| *F24F 13/20* | (2006.01) |
| *F24F 13/28* | (2006.01) |
| *F24F 13/30* | (2006.01) |

(52) U.S. Cl.
CPC .......... *F24F 11/0001* (2013.01); *F24F 7/065* (2013.01); *F24F 11/74* (2018.01); *F24F 13/14* (2013.01); *F24F 13/20* (2013.01); *F24F 13/28* (2013.01); *F24F 13/30* (2013.01)

(58) Field of Classification Search
CPC ........ F24F 11/0001; F24F 7/065; F24F 11/74; F24F 13/14; F24F 13/20; F24F 13/28; F24F 13/30; F24F 1/0035; F24F 7/007; F24F 8/108; F24F 11/77; F24F 13/10; F24F 13/24; F24F 13/105; F24F 2013/247; F24F 8/10; F24F 1/0011; F24F 11/63; F24F 11/70; F24F 13/12; Y02B 30/70

See application file for complete search history.

(56) References Cited

U.S. PATENT DOCUMENTS

2020/0049367 A1* 2/2020 Funada ............... F24F 13/1413

FOREIGN PATENT DOCUMENTS

| | | | |
|---|---|---|---|
| CN | 204301219 U | 4/2015 | |
| CN | 106524460 A * | 3/2017 | |
| CN | 108644895 A * | 10/2018 | ............ F24F 1/0007 |
| CN | 108644895 A | 10/2018 | |
| CN | 109425031 A * | 3/2019 | |
| CN | 109425031 A | 3/2019 | |

(Continued)

OTHER PUBLICATIONS

Notice of Reasons for Refusal of Japanese Patent Application No. 2021-154386, dated Nov. 8, 2022.

(Continued)

*Primary Examiner* — Mohammad Ali
*Assistant Examiner* — Dhruvkumar Patel
(74) *Attorney, Agent, or Firm* — Finnegan, Henderson, Farabow, Garrett & Dunner, L.L.P

(57) ABSTRACT

A ventilation and air conditioning system includes: a ventilation and air conditioning body; and an air-opening varying component provided at a ventilation outlet of the ventilation and air conditioning body.

15 Claims, 6 Drawing Sheets

(56) References Cited

FOREIGN PATENT DOCUMENTS

| | | | | |
|---|---|---|---|---|
| CN | 109489171 | A | | 3/2019 |
| CN | 109945311 | A | | 6/2019 |
| CN | 209181181 | U | | 7/2019 |
| CN | 110962547 | A * | 4/2020 | ........... B60H 1/3414 |
| CN | 111640511 | A | | 9/2020 |
| JP | H01123931 | A | | 5/1989 |
| JP | H 02122144 | A | | 5/1990 |
| JP | H06257842 | A * | 9/1994 | |
| JP | H06257842 | A | | 9/1994 |
| JP | H1078254 | A | | 3/1998 |
| JP | H1078254 | A * | 3/1998 | |
| JP | 2004150713 | A * | 5/2004 | |
| JP | 2009008376 | A | | 1/2009 |
| JP | 2009058188 | A * | 3/2009 | |
| JP | 2009058188 | A | | 3/2009 |
| JP | 4352624 | B2 * | 10/2009 | |
| JP | 2011129997 | A | | 6/2011 |
| JP | 2019049954 | A | | 3/2019 |
| KR | 100698910 | B1 * | 3/2007 | |
| KR | 20110103012 | A * | 9/2011 | |
| WO | WO-2011032694 | A1 * | 3/2011 | ........... B60H 1/3457 |
| WO | WO-2019207854 | A1 * | 10/2019 | |

OTHER PUBLICATIONS

Notice of Reasons for Refusal of Japanese Application No. 2020-166061, dated Sep. 28, 2021.
Request for Submission of an Opinion of Korean Patent Application No. 10-2021-0015442, dated Apr. 20, 2023, 8 pages.
Second Office Action in Chinese Application No. 202010291884.6, dated Dec. 14, 2020, 25 pages.
Partial European Search Report in Application No. 20217511.3, dated Jun. 17, 2021.
First Office Action for Chinese Application No. 202010291884.6, dated Sep. 24, 2020.

* cited by examiner

VENTILATION AND AIR CONDITIONING SYSTEM AND METHOD FOR REGULATING AIR OPENING

CROSS-REFERENCE TO RELATED APPLICATIONS

This application is based upon and claims priority to Chinese Patent Application No. 202010291884.6, filed on Apr. 14, 2020, the entire contents of which are incorporated herein by reference.

TECHNICAL FIELD

The present disclosure relates to the field of air conditioning technology, and more particularly, to a ventilation and air conditioning system and a method for regulating an air opening.

BACKGROUND

Single-duct systems are widely used in the air conditioner industry, that is, air-input and air-output systems of the air conditioner share the same duct. Due to a small size of the duct, the association standard, T/CAB CSISA 0038-2020 ("Artificial environment comfort products Part 4: Room air conditioner with outdoor air function"), requires that a noise value of the ventilation-air conditioner should meet a noise value standard corresponding to a specific ventilation volume.

To meet the above noise reduction requirement, a mute mode of a current air conditioner structure is realized by active noise reduction, such as a measure of reducing a rotation speed of a blower. However, the reduction of the rotation speed of the blower may diminish the ventilation volume of the air conditioner, and thus affect the user experience indoors.

SUMMARY

The present disclosure provides a ventilation and air conditioning system and a method for regulating an air opening, so as to realize noise reduction for a ventilation-air conditioner without changing a rotation speed of a blower.

A first aspect of embodiments of the present disclosure provides a ventilation and air conditioning system. The system includes: a ventilation and air conditioning body; and an air-opening varying component provided at a ventilation outlet of the ventilation and air conditioning body.

A second aspect of embodiments of the present disclosure provides a method for regulating the air opening applicable to the ventilation and air conditioning system. The method includes the following steps. A controller sends a first blower a request command for requesting a rotation-speed value of the first blower. In response to the request command, the first blower sends the rotation-speed value to the controller. The controller determines the size of the air opening of the ventilation outlet according to the rotation-speed value, and sends the air-opening varying component a control command for regulating the size of the air opening. The air-opening varying component regulates the size of the air opening of the ventilation outlet according to the control command.

For the ventilation and air conditioning system with independent air ducts, the ventilation system and the heat exchanging system operate independently. An increase in noise of the ventilation system is caused due to a small air duct when the ventilation system is operating with maximum ventilation. Meanwhile, after the heat exchanging system operates together, the noises of the two systems are superimposed, which will affect the user experience indoors. By arranging the air-opening varying component at the ventilation outlet of the ventilation system, when it is detected that the rotation speed of the first blower of the ventilation system is increased, the size of the air opening of the ventilation outlet is changed actively, such that the air flow velocity decreases in the case of an increased air volume, thus effectively reducing the air flow noise during the operation of the ventilation system operates, and improving the user experience.

In the embodiments, the air-opening varying component is mounted at the ventilation outlet of the ventilation system, and the air-opening varying component controlling the size of the air opening and the ventilation system are subject to coordinated control. When it is detected that the rotation speed of the first blower of the ventilation system is increased, the size of the air opening may be actively expanded, and thus the air flow velocity is decreased, so as to reduce the noise generated by the air flow at the air opening, and improve the user experience.

By mounting the air-opening varying component, when the ventilation system is operating, the size of the air opening can be regulated according to the rotation speed of the blower of the indoor ventilation system. As a result, when the ventilation system increases the air volume, the air flow velocity decreases and the noise caused by the air flow is reduced, thus realizing better user experience.

Through the use of the air-opening varying component, when the increase of the rotation speed of the blower of the indoor ventilation system is detected, the size of the air opening can be automatically regulated, to decrease the air flow velocity of the ventilation system, reduce the noise caused by the air flow, and effectively improve the indoor noise when the ventilation-air conditioner is operating in both the ventilation state and the cooling/heating state.

It should be understood that both the foregoing general description and the following detailed description are example and explanatory only, and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

The labels in the drawings include.

1—air-opening varying component, 2—ventilation system, 3—heat exchanging system, 4—ventilation inlet, 5—ventilation outlet, 6—housing, 7—purification chamber, 8—filter screen, 9—first blower, 10—heat exchanging unit, 11—air inlet duct, 12—partition board, 13—heat exchanging inlet, 14—heat exchanging outlet, 15—baffle, 16—first notch, 17—first connecting block, 18—second connecting block, 19—first linkage, 20—second linkage, 21—third linkage, 22—fourth linkage, 23—first limiting shaft, 24—fifth linkage, 25—first gear, 26—gear ring, 27—first connecting disc 28—second limiting shaft, 29—third limiting shaft, 30—fourth limiting shaft, 31—first groove, 32—second groove, 33—third groove, 34—regulating plate, 35—second connecting disc, 36—bracket, 37—second blower.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of apparatuses and methods consistent with aspects related to the present disclosure as recited in the appended claims.

Figure 1:
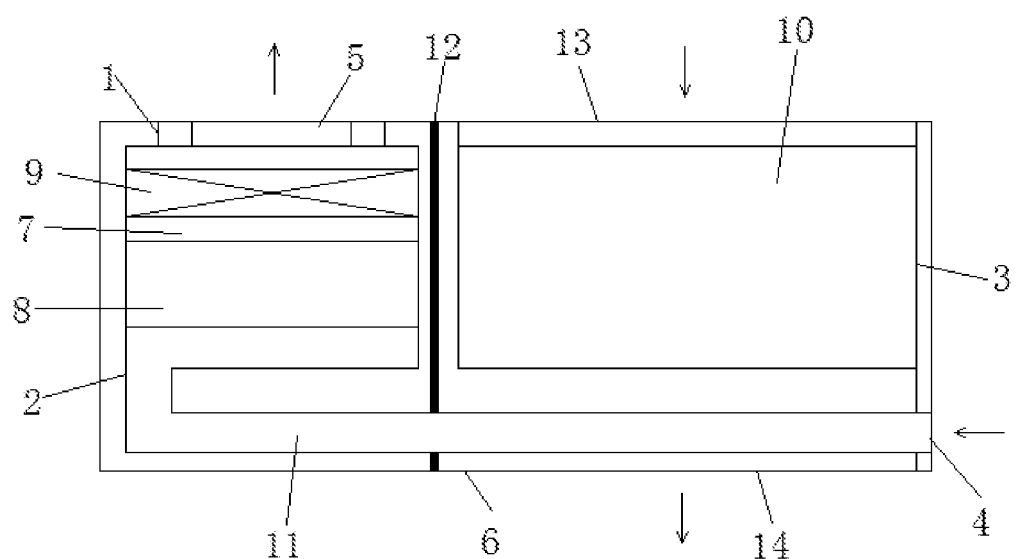
FIG. 1 is a schematic view of a ventilation and air conditioning system according to an embodiment.
Figure 2:
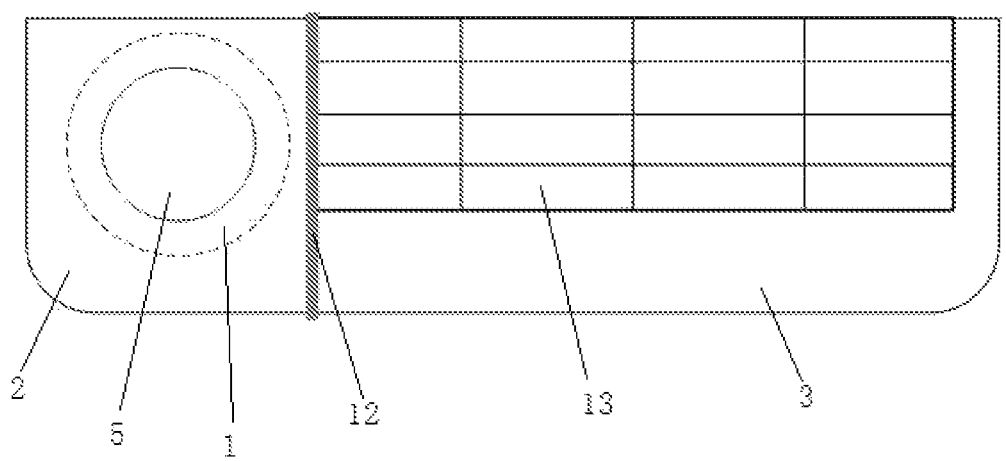
FIG. 2 is a top view of the ventilation and air conditioning system according to an embodiment.

FIG. 1 is a schematic view of a ventilation and air conditioning system, according to an embodiment. FIG. 2 is a top view of the ventilation and air conditioning system, according to an embodiment. As illustrated in FIG. 1 and FIG. 2, the ventilation and air conditioning system includes a ventilation and air conditioning body and an air-opening varying component 1 arranged at a ventilation outlet 5 of the ventilation and air conditioning body. The ventilation and air conditioning body includes a ventilation system 2 and a heat exchanging system 3, and the air-opening varying component 1 is arranged at the ventilation outlet 5 of the ventilation system 2. The air-opening varying component 1 regulates a size of an air opening of the ventilation outlet 5 of the ventilation system 2 according to a rotation speed of the ventilation system 2. The ventilation and air conditioning system also includes a controller (not shown) configured to request a rotation-speed value of a first blower 9, determine the size of the air opening of the ventilation outlet 5 based on the rotation-speed value, and send the air-opening varying component 1 a control command for regulating the size of the air opening. A driving mechanism is provided between the controller and the air-opening varying component 1 and is configured to execute a driving command of the controller, thereby realizing drive control over the air-opening varying component 1, so as to achieve a purpose of regulating the size of the air opening of the ventilation outlet 5 by the air-opening varying component 1.

For the ventilation and air conditioning system with independent air ducts, the ventilation system and the heat exchanging system operate independently. An increase in noise of the ventilation system is caused due to a small air duct when the ventilation system is operating with maximum ventilation. Meanwhile, after the heat exchanging system operates together, the noises of the two systems are superimposed, which will affect the user experience indoors. By arranging the air-opening varying component at the ventilation outlet of the ventilation system, when it is detected that the rotation speed of the first blower of the ventilation system is increased, the size of the air opening of the ventilation outlet is changed actively, such that the air flow velocity decreases in the case of an increased air volume, thus effectively reducing the air flow noise during the operation of the ventilation system operates, and improving the user experience.

For example, the air-opening varying component is mounted at the ventilation outlet 5 of the ventilation system 2, and the air-opening varying component 1 controlling the size of the air opening and the ventilation system 2 are subject to coordinated control. When it is detected that the rotation speed of the first blower 9 of the ventilation system 2 is increased, the size of the air opening may be actively expanded, and thus the air flow velocity is decreased, so as to reduce the noise generated by the air flow at the air opening, and improve the user experience.

By mounting the air-opening varying component 1, when the ventilation system 2 is operating, the size of the air opening can be regulated according to the rotation speed of the blower of the indoor ventilation system. As a result, when the ventilation system 2 increases the air volume, the air flow velocity decreases and the noise caused by the air flow is reduced, thus realizing better user experience.

Through the use of the air-opening varying component 1, when the increase of the rotation speed of the blower of the indoor ventilation system is detected, the size of the air opening can be automatically regulated, to decrease the air flow velocity of the ventilation system 2, reduce the noise caused by the air flow, and effectively improve the indoor noise when the ventilation-air conditioner is operating in both the ventilation state and the cooling/heating state.

The ventilation and air conditioning system may be used in the domestic ventilation and air conditioning scenes, but is not limited to the air conditioning scenes, and can also be applied to domestic air management unit scenes including air purification scenes and ventilator scenes.

In an embodiment, a method for regulating the air opening may be applied to the ventilation and air conditioning system. The method includes: the controller sends the first blower 9 a request command for requesting a rotation-speed value of the first blower; in response to the request command, the first blower 9 sends the rotation-speed value to the controller; the controller determines the size of the air opening of the ventilation outlet 5 according to the rotation-speed value, and sends the air-opening varying component 1 a control command for regulating the size of the air opening; and the air-opening varying component 1 regulates the size of the air opening of the ventilation outlet 5 according to the control command.

For the ventilation and air conditioning system with independent air ducts, the ventilation system and the heat exchanging system operate independently. The noise of the ventilation system is increased due to a small air duct when the ventilation system is operating with maximum ventilation. Meanwhile, after the heat exchanging system operates together, the noises of the two systems are superimposed, which will affect the user experience indoors. By arranging the air-opening varying component at the ventilation outlet of the ventilation system, when it is detected that the rotation speed of the first blower of the ventilation system is increased, the size of the air opening of the ventilation outlet is changed actively, such that the air flow velocity decreases in the case of an increased air volume, thus effectively reducing the air flow noise during the operation of the ventilation system, and improving the user experience.

For example, the air-opening varying component 1 is mounted at the ventilation outlet 5 of the ventilation system, and the air-opening varying component 1 controlling the size of the air opening is controlled in conjunction with the ventilation system 2. When it is detected that the rotation speed of the first blower 9 of the ventilation system 2 is increased, the size of the air opening may be actively expanded, and thus the air flow velocity is decreased, so as to reduce the noise generated by the air flow at the air opening, and improve the user experience.

By mounting the air-opening varying component 1, when the ventilation system 2 is operating, the size of the air opening can be regulated according to the rotation speed of the blower of the indoor ventilation system. As a result, when the ventilation system 2 increases the air volume, the air flow velocity decreases and the noise caused by the air flow is reduced, thus realizing better user experience.

Through the use of the air-opening varying component 1, when the increase of the rotation speed of the blower of the indoor ventilation system is detected, the size of the air opening can be automatically regulated, to decrease the air flow velocity of the ventilation system 2, reduce the noise caused by the air flow, and effectively improve the indoor noise when the ventilation-air conditioner is operating in both the ventilation state and the cooling/heating state.

When the ventilation system is working, the rotation speed of the first blower is too high, such that air in a purification chamber is rapidly discharged from the ventilation outlet, resulting in a whistling sound caused by the rapid outflow of the air. However, by arranging the air-opening varying component 1 at the ventilation outlet, the size of the air opening of the ventilation outlet may be enlarged or narrowed according to the rotation speed of the first blower which keeps unchanged.

For example, when the rotation speed of the first blower 9 is greater than r, a rotation-speed sensor collects the rotation-speed value of the first blower 9, and transmits the collected rotation-speed value to the controller which receives a rotation-speed value greater than r. The controller then sends a command to the driving mechanism, such that the driving mechanism can enlarge an opening of the air-opening varying component 1, and the air opening of the ventilation outlet 5 can become larger. In such a way, with the air speed unchanged, the whistling sound generated by the rapid outflow of the air is reduced, and more fresh air may flow indoors, enhancing the ventilation efficiency.

When the rotation speed of the first blower 9 is less than r, the rotation-speed sensor collects the rotation-speed value of the first blower 9, and transmits the collected rotation-speed value to the controller which receives a rotation-speed value less than r. The controller then sends a command to the driving mechanism, such that the driving mechanism can narrow the opening of the air-opening varying component 1, and the air opening of the ventilation outlet 5 can become smaller. Therefore, in the case of low air speed, the small ventilation outlet is used for indoor air filtration, reducing the possibility that external air flows back to the purification chamber via a too-large ventilation outlet, and improving the service life of the ventilation system and that of a filter screen.

Figure 6:
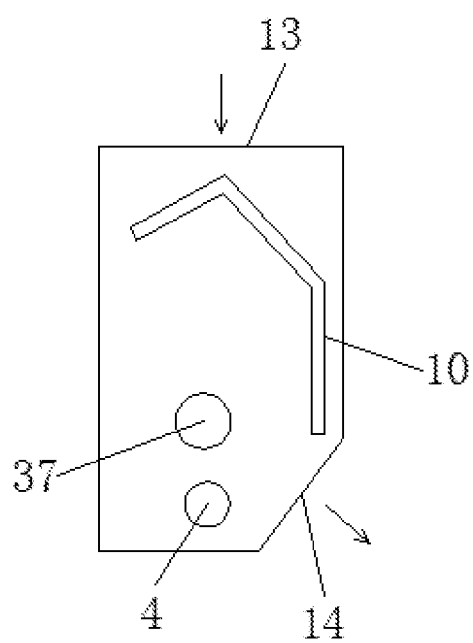
FIG. 6 is a left view of the ventilation and air conditioning system according to an embodiment.

FIG. 6 is a left view of the ventilation and air conditioning system, according to an embodiment. As illustrated in FIGS. 1, 2 and 6, the ventilation system 2 has a first end configured as the ventilation outlet 5 and a second end configured as a ventilation inlet 4. The ventilation system 2 and the heat exchanging system 3 are arranged in a common housing 6, and a partition board 12 is provided between the ventilation system 2 and the heat exchanging system 3. A heat exchanging inlet 13 of the heat exchanging system 3 and the ventilation outlet 5 of the ventilation system 2 are on a common surface of the housing 6. A purification chamber 7 is provided in the ventilation system 2, and the purification chamber 7 has a first end connected with the ventilation inlet 4 and a second end connected with the ventilation outlet 5. The purification chamber 7 is provided with a detachable filter screen 8. The first blower 9 is provided between the filter screen 8 and the ventilation outlet 5 and adjacent to the ventilation outlet 5. A heat exchanging unit 10 is provided between the heat exchanging inlet 13 and a heat exchanging outlet 14 of the heat exchanging system 3. The heat exchanging outlet 14 of the heat exchanging system 3 is provided with an air inlet duct 11. The air inlet duct 11 leads to the ventilation outlet 5 at a first end, and a second end of the air inlet duct 11 is connected with the purification chamber 7. The ventilation outlet 5 runs through the housing 6 and is in connection with the exterior of the housing 6. The ventilation and air conditioning system also includes the controller configured to request a rotation-speed value of the first blower 9, determine a size of an air opening of the ventilation outlet 5, and send the air-opening varying component 1 a control command for regulating the size of the air opening. The driving mechanism is provided between the controller and the air-opening varying component 1 and is configured to execute a driving command of the controller, thereby realizing drive control over the air-opening varying component 1, to realize a purpose of regulating the size of the air opening of the ventilation outlet by the air-opening varying component 1.

The air inlet duct 11 of the ventilation system 2 passes through the heat exchanging outlet 14 of the heat exchanging system 3, such that the heat exchanging system 3 utilizes heat-exchanged air to exchange heat with the air passing through the air inlet duct 11. In such a way, the air introduced by the air inlet duct 11 from the indoor to the purification chamber 7 has experienced heat exchange in advance, then is filtered by the filter screen 8 in the purification chamber 7, and is discharged through the ventilation outlet 5. During the discharge, since the rotation speed of the first blower 9 is too high, the air in the purification chamber 7 is rapidly discharged from the ventilation outlet 5, resulting in the whistling sound caused by the rapid outflow of the air. However, by arranging the air-opening varying component 1 at the ventilation outlet 5, the size of the air opening of the ventilation outlet 5 may be enlarged or narrowed according to the rotation speed of the first blower 9 which keeps unchanged.

For example, when the rotation speed of the first blower 9 is greater than r, the rotation-speed sensor collects the rotation-speed value of the first blower 9, and transmits the collected rotation-speed value to the controller which receives a rotation-speed value greater than r. The controller then sends a command to the driving mechanism, such that the driving mechanism can enlarge an opening of the air-opening varying component 1, and the air opening of the ventilation outlet 5 can become larger. In such a way, with the air speed unchanged, the whistling sound generated by the rapid outflow of the air flow is reduced, and more fresh air may flow indoors, improving the ventilation efficiency.

When the rotation speed of the first blower 9 is less than r, the rotation-speed sensor collects the rotation-speed value of the first blower 9, and transmits the collected rotation-speed value to the controller which receives a rotation-speed value less than r. The controller then sends a command to the driving mechanism, such that the driving mechanism can narrow the opening of the air-opening varying component 1, and the air opening of the ventilation outlet 5 can become smaller. Therefore, in the case of low air speed, the small ventilation outlet is used for indoor air filtration, reducing the possibility that external air flows back to the purification chamber 7 via the ventilation outlet 5 due to the ventilation outlet being too large, so as to improve the service life of the ventilation system and the service life of the filter screen 8. The partition board is configured to separate the ventilation system and the heat exchanging system, so that the air directions of the ventilation system and the heat exchanging system will not interfere with each other.

The ventilation system 2 is configured to purify air, and the heat exchanging system 3 is configured for heat exchange. The air inlet duct 11 of the ventilation system 2 passes through the heat exchanging outlet 14 of the heat exchanging system 3, so that the heat exchanging system 3 can perform heat exchange on the input air of the ventilation system 2 during heat exchange. Thus, the temperature difference between the air purification by the ventilation system 2 and the heat exchange with the indoor air is reduced, diminishing the temperature fluctuation between the ventilation system 2 and the indoor, and improving the indoor comfort.

The air direction of the ventilation outlet 5 is opposite the air direction of the heat exchanging inlet 13. The air inlet duct 11 runs through the partition board 12 and passes through the heat exchanging outlet 14. The air direction of the air inlet duct 11 is perpendicular to the air direction of the heat exchanging outlet 14. The heat exchanging unit 10 is configured in a U-shaped structure. An end of the heat exchanging unit 10 away from an opening of the U-shaped structure faces the heat exchanging inlet 13, and the heat exchanging outlet 14 is arranged at an end of the heat exchanging unit 10 adjacent to the opening of the U-shaped structure. A second blower 37 is provided at the end adjacent to the opening of the U-shaped structure of the heat exchanging unit 10, and is fixed inside the housing 6. The air inlet duct 11 is arranged inside the housing 6 and adjacent to the heat exchanging outlet 14. The heat exchanging unit 10 is preferably a finned heat exchanger of an air conditioner.

The second blower 37 is configured to discharge the air that has undergone heat exchange in the heat exchanging system 3, and the first blower 9 is configured to discharge the air that has been purified in the purification chamber 7. The air inlet duct 11 is configured as a duct, such as a metal duct or a plastic duct with the same material as the housing 6. The duct may be formed separately or integrally with the housing 6.

The air direction of the air inlet duct 11 is perpendicular to the air direction of the heat exchanging outlet 14, such that cold/warm air flowing out of the heat exchanging outlet 14 cools or heats the air in the air inlet duct 11, and hence the air flowing into the purification chamber 7 from the air inlet duct 11 is heat-exchanged in advance, further realizing the reduction in the temperature difference between the indoor air and the clean air that flows into the room after being purified in the purification chamber 7.

Further, an outer diameter of the air inlet duct 11 is smaller than an inner diameter of the heat exchanging outlet 14, such that the heat-exchanged air can be better diffused by the heat exchanging outlet 14. Meanwhile, after the air passing through the air inlet duct 11 is heat-exchanged in advance by the heat exchanging outlet 14, the air arriving in the purification chamber 7 can be heat-exchanged in advance, so as to further reduce the likelihood that the temperature difference between the fresh air discharged from the purification chamber 7 and the indoor air is large.

The air inlet duct 11 can run through the partition board 12 and a side wall of the housing 6, and can be connected with the exterior of the housing 6, so that the indoor air can be introduced through the ventilation inlet into the purification chamber 7.

An outer sidewall of the air inlet duct 11 can abut against an inner wall of the housing 6, or abut against an inner wall of the heat exchanging outlet 14, so as to cause the air flowing through the air inlet duct 11 to be heat-exchanged in advance by using the air that has experienced heat exchange and is discharged from the heat exchanging outlet 14. Since the outer diameter of the air inlet duct 11 is smaller than the inner diameter of the heat exchanging outlet 14, the air inlet duct 11 does not affect the air discharge of the heat exchanging outlet 14.

By arranging the first blower 9 adjacent to the ventilation outlet 5, the purification chamber 7 discharges the purified fresh air into the room, so as to improve the purification efficiency of the ventilation system, and further lower the possibility that the filter screen 8 contaminates the air discharged from the ventilation outlet 5.

In an embodiment, the first blower 9 is arranged between the filter screen 8 and the air inlet duct 11, so that more air introduced by the air inlet duct 11 can enter the purification chamber 7, and be discharged into the room from the ventilation outlet 5 after being purified by the purification chamber 7.

In an embodiment, the first blowers 9 are provided at both sides of the filter screen 8, one of the first blowers 9 is adjacent to the air inlet duct 11, and the other one is adjacent to the ventilation outlet 5. In such a way, more air can be introduced into the purification chamber 7 by the air inlet duct 11, and after the air is purified by the purification chamber 7, the first blower 9 adjacent to the ventilation outlet 5 can discharge the purified air into the room more efficiently.

In an embodiment, the ventilation outlet 5 of the ventilation system 2 is located at the top of the housing 6. The ventilation outlet 5 is also provided with a closing device configured to open or close the ventilation outlet 5, so as to realize the possibility of failure of the ventilation system 2 or the air-opening varying component 1 caused by the dust accumulation in the ventilation system 2 and the air-opening varying component 1 when not in use.

Figure 3:
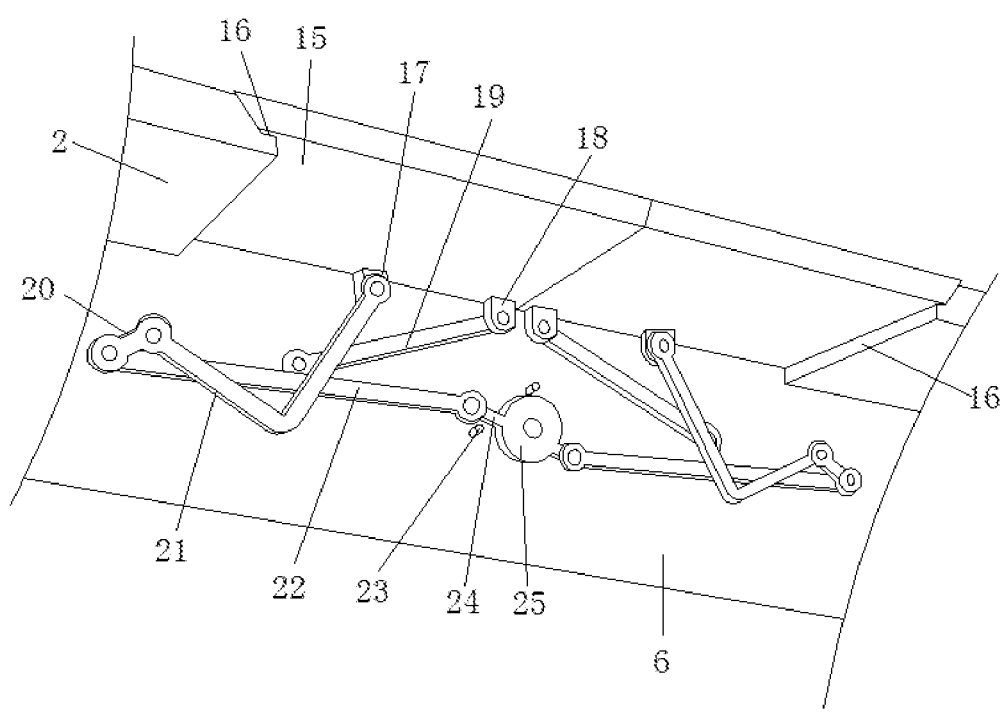
FIG. 3 is a schematic view of a closing device according to an embodiment.

FIG. 3 is a schematic view of a closing device according to an embodiment. Referring to FIGS. 1-3, the ventilation outlet 5 is provided with a first notch 16 on a side adjacent to the exterior of the housing 6, and the first notch 16 is arranged along a circle of the ventilation outlet 5. The first notch 16 is configured to cooperate with the closing device to close the ventilation outlet 5. The closing device includes a baffle 15, a first gear 25 and a linkage mechanism. For example, two groups of the baffles 15 and the linkage mechanisms are provided. One end of the linkage mechanism is connected to the baffle 15, and the other end of the linkage mechanism is connected to the first gear 25. A first connecting block 17 and a second connecting block 18 are provided on a lower side of the baffle 15 and spaced apart from each other. The first connecting block 17 and the second connecting block 18 are rotatably connected to a third linkage 21 and a first linkage 19 of the linkage mechanism, respectively. The other end of the first linkage 19 is rotatably connected to an inner wall of the housing 6. The third linkage 21 is configured in an L structure, and one end of the L structure is rotatably connected to the first connecting block 17, while the other end of the L structure is rotatably connected to the inner wall of the housing 6. An end of the third linkage 21 away from the first connecting block 17 also extends and is provided with a second linkage 20. An end of the second linkage 20 away from the third linkage 21 is rotatably connected to a fourth linkage 22. The other end of the fourth linkage 22 is rotatably connected to a fifth linkage 24, and the other end of the fifth linkage 24 is rotatably connected to an outer peripheral wall of the first gear 25. The first gear 25 is rotatably arranged on the inner wall of the housing 6. Two first limiting shafts 23 are provided above and at a left side of the gear and are spaced apart from each other. The fifth linkage 24 is located between the two first limiting shafts 23 and reciprocates along with the rotation of the first gear 25. The second connecting block 18 is arranged adjacent to an edge of the baffle 15, and the first connecting block 17 is arranged on a side of the baffle 15 adjacent to the first notch 16.

When in use, the first gear 25 is connected to a motor, and the reciprocating rotation of the motor can drive the first gear 25 to rotate reciprocally, which in turn drives the linkage mechanism to operate. Thus, the linkage mechanism can move the baffle 15 upwards from the first notch 16, such that the baffle 15 opens the ventilation outlet 5 and makes it usable. The motor is connected to the controller, and when the ventilation system starts, the motor is also started and drives the baffle 15 to open the ventilation outlet 5, so as to realize the purpose of outputting fresh air.

The specific working process is illustrated in FIG. 3. When the first gear 25 rotates forward, two fifth linkages 24 connected to the first gear 25 rotate clockwise along with the first gear 25, and brings the fifth linkage 24 on the left side to move upwards and rightwards. The fifth linkage 24 drives the second linkage 20 to rotate anticlockwise around a rotating shaft provided on the inner wall of the housing, and at this time, the third linkage 21 will rotate anticlockwise as well, so as to jack up the baffle 15. That is, the baffle 15 can be lifted upwards. Since the third linkage 21 is of the L structure, the L structure can move the baffle 15 leftwards when jacking up the baffle 15, such that the ventilation outlet 5 can be fully opened. When the first gear 25 rotates forward, the linkage mechanism symmetrically arranged on the right side is driven to move in an opposite direction to the linkage mechanism on the left side, such that both baffles 15 can open the ventilation outlet 5. When the first gear 25 rotates reversely, the ventilation outlet 5 can be closed.

Figure 4:
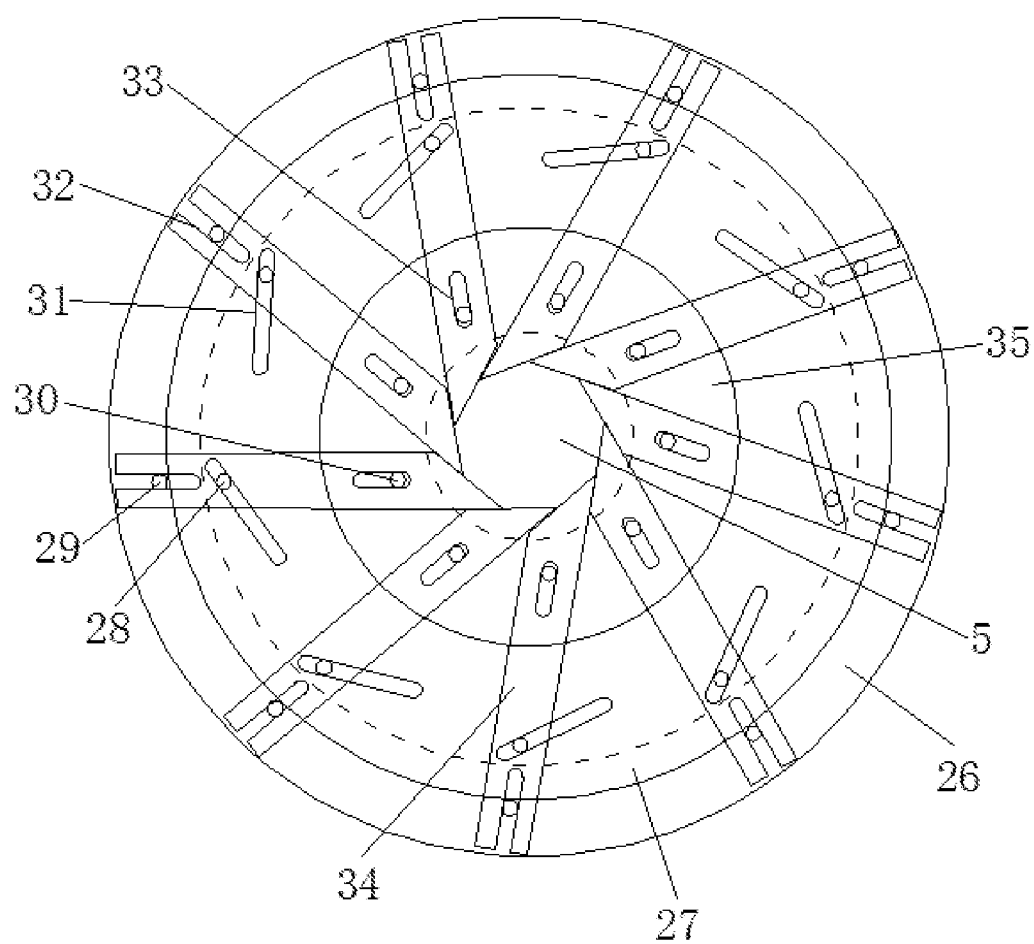
FIG. 4 is a schematic view of an air-opening varying component according to an embodiment.
Figure 5:
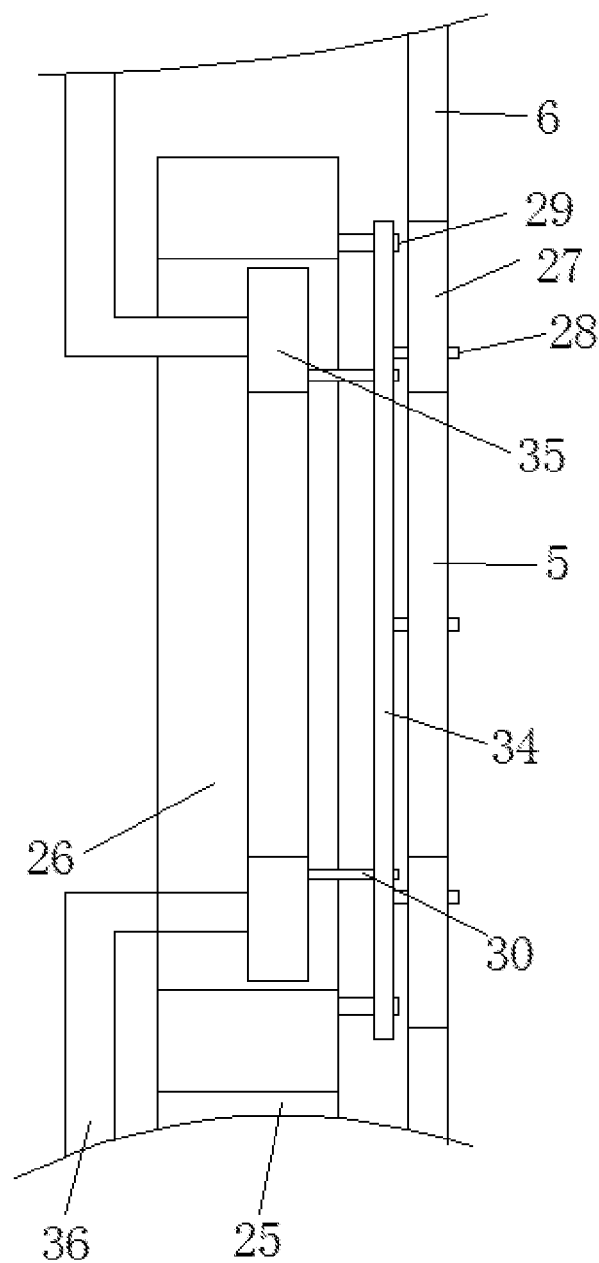
FIG. 5 is a left view of an air-opening varying component according to an embodiment.

FIG. 4 is a schematic view of the air-opening varying component 1 according to an embodiment. FIG. 5 is a left view of the air-opening varying component 1 according to an embodiment. Referring FIG. 4 and FIG. 5, the air-opening varying component 1 includes: a gear ring 26, a first connecting disc 27, a second connecting disc 35 and an air opening regulating mechanism. A ventilation outlet regulating port is provided in a center of the first connecting disc 27. The air opening regulating mechanism is arranged between the gear ring 26 and the first connecting disc 27. An outer side of the first connecting disc 27 is connected with the inner wall of the housing. The air opening regulating mechanism includes a plurality of regulating plates 34, and in the embodiment, there are at least nine regulating plates 34 that are evenly arranged around a center of the ventilation outlet regulating port. A first end of the regulating plate 34 located at the ventilation outlet regulating port is configured as an inclined surface. The inclined surface of each regulating plate abuts against a side wall of the adjacent regulating plate 34. A second groove 32 of a U-shaped structure is provided in a second end of the regulating plate 34 away from the inclined surface. An inner ring of the gear ring 26 is fitted over the second connecting disc 35, and a first side of the second connecting disc 35 away from the regulating plate 34 is supported on the inner wall of the housing by a bracket 36. There are a plurality of brackets 36 spaced apart on the second connecting disc 35. A second side of the second connecting disc 35 adjacent to the regulating plate 34 is evenly provided with a plurality of fourth limiting shafts 30. The first end of the regulating plate 34 adjacent to the inclined surface is provided with a third groove 33, and the third groove 33 is configured for the reciprocating movement of the fourth limiting shaft 30. The opening directions of the second groove 32 and the third groove 33 are both configured to extend along a length direction of the regulating plate 34. There are a plurality of first grooves 31 evenly arranged in the first connecting disc 27. The regulating plate 34 is provided with a second limiting shaft 28, and the second limiting shaft 28 reciprocates in the first groove 31. The first groove 31 is obliquely arranged, and an angle of inclination is consistent with the inclined surface of the regulating plate 34.

A side of the gear ring 26 adjacent to the regulating plate 34 is provided with a third limiting shaft 29, and the third limiting shaft 29 reciprocates in the second groove 32.

When in use, the gear ring 26 engages with the outer peripheral wall of the first gear 25, and the movement of the first gear 25 can bring the air-opening varying component 1 to move along, so as to enable the closing device to be opened or closed. Meanwhile, the air-opening varying component 1 can be started to regulate the size of the ventilation outlet 5. In order to drive the air-opening varying component 1 separately, the gear ring 26 may be separately connected to a driving device to be driven. Both the driving device and the motor are connected with the controller, so as to realize a purpose of activating the driving device and the motor for operation by the controller.

In an embodiment, after the gear ring 26 rotates, the third limiting shaft 29 arranged on the side of the gear ring 26 adjacent to the regulating plate 34 can move back and forth in the second groove 32 of the regulating plate 34, such that the regulating plate 34 moves back and forth. Hence, the second limiting shaft 28 on the regulating plate 34 can move in the first groove 31 of the first connecting disc 27, and the fourth limiting shaft 30 on the second connecting disc 35 moves along in the third groove 33 of the regulating plate 34. In such a way, the size regulation of the ventilation outlet regulating port can be achieved by the first end of the regulating plate 34 where the inclined surface is located. When the regulating plate 34 moves clockwise, the ventilation outlet 5 is opened. When the regulating plate 34 moves anticlockwise, the ventilation outlet 5 is closed. By adjusting the clockwise or anticlockwise movement position of the regulating plate 34, the size of the ventilation outlet 5 can be regulated. Therefore, when the air speed of the first blower keeps unchanged, the size of the ventilation outlet 5 can be regulated, reducing the noise caused by a large air volume flowing through a small outlet, and improve the user experience.

Obviously, those skilled in the art can make various modifications and variations to the embodiments of the present disclosure without departing from the spirit or scope of the present disclosure. Accordingly, the present disclosure includes the modifications and variations that fall within the scope of the claims and the equivalent thereof.

What is claimed is:
1. A ventilation and air conditioning system, comprising:
   a housing;
   a ventilation and air conditioning body comprising a ventilation system and a heat exchanging system, the ventilation system and the heat exchanging system being arranged in the housing, the heat exchanging system comprising a heat exchanging outlet, and the ventilation system comprising a ventilation inlet, a ventilation outlet, and a first blower;
an air-opening varying component provided at the ventilation outlet of the ventilation system; and
a controller,
wherein a partition board is provided in the housing and between the ventilation system and the heat exchanging system and separates the ventilation system and the heat exchanging system;
a purification chamber is provided in the ventilation system, and the purification chamber has a first end connected with the ventilation inlet and a second end connected with the ventilation outlet;
an air inlet duct is arranged between the ventilation inlet and the ventilation outlet, has a first end leading to the ventilation outlet and a second end connected with the purification chamber, and penetrates the partition board and extends through the heat exchanging outlet;
the controller sends the first blower a request command for requesting a rotation-speed value of the first blower, and the first blower sends the rotation-speed value to the controller in response to the request command;
the controller determines a size of an air opening of the ventilation outlet according to the rotation-speed value, and sends the air-opening varying component a control command for regulating the size of the air opening; and
the air-opening varying component regulates the size of the air opening of the ventilation outlet according to the control command.

2. The ventilation and air conditioning system according to claim 1, wherein the ventilation system has a first end configured as the ventilation outlet and a second end configured as the ventilation inlet; and
a heat exchanging inlet of the heat exchanging system and the ventilation outlet of the ventilation system are on a common surface of the housing.

3. The ventilation and air conditioning system according to claim 1, wherein the purification chamber is provided with a detachable filter screen, and the first blower is provided between the detachable filter screen and the ventilation outlet and adjacent to the ventilation outlet.

4. The ventilation and air conditioning system according to claim 1, wherein a heat exchanging unit is provided between the heat exchanging inlet and the heat exchanging outlet of the heat exchanging system; and
the ventilation outlet runs through the housing and is in connection with an exterior of the housing.

5. The ventilation and air conditioning system according to claim 4, wherein the heat exchanging unit is configured in a U-shaped structure, an end of the heat exchanging unit away from an opening of the U-shaped structure faces the heat exchanging inlet, and the heat exchanging outlet is arranged at an end adjacent to the opening of the U-shaped structure; and
a second blower is provided at the end adjacent to the opening of the U-shaped structure.

6. The ventilation and air conditioning system according to claim 3, wherein:
first blowers are provided at both sides of the detachable filter screen, one of the first blowers is adjacent to the air inlet duct, and another one of the first blowers is adjacent to the ventilation outlet.

7. The ventilation and air conditioning system according to claim 1, wherein the ventilation outlet is also provided with a closing device configured to open or close the ventilation outlet.

8. The ventilation and air conditioning system according to claim 7, wherein the ventilation outlet is provided with a first notch on a side adjacent to an exterior of the housing, and the first notch is arranged along a circle of the ventilation outlet and configured to cooperate with the closing device to close the ventilation outlet.

9. The ventilation and air conditioning system according to claim 7, wherein the closing device comprises a baffle, a first gear, and a linkage mechanism; and
the linkage mechanism has a first end connected to the baffle and a second end connected to the first gear.

10. The ventilation and air conditioning system according to claim 1, wherein the air-opening varying component comprises a gear ring, a first connecting disc, a second connecting disc, and an air opening regulating mechanism;
a ventilation outlet regulating port is provided in a center of the first connecting disc; and
the air opening regulating mechanism is arranged between the gear ring and the first connecting disc, and comprises a plurality of regulating plates evenly arranged around a center of the ventilation outlet regulating port.

11. The ventilation and air conditioning system according to claim 10, wherein a first end of a regulating plate located at the ventilation outlet regulating port is configured as an inclined surface, and the inclined surface of each regulating plate abuts against a side wall of an adjacent regulating plate.

12. The ventilation and air conditioning system according to claim 10, wherein a plurality of first grooves are evenly provided in the first connecting disc; the regulating plate is provided with a limiting shaft; and the limiting shaft reciprocates in the first groove.

13. The ventilation and air conditioning system according to claim 11, wherein a second groove of a U-shaped structure is provided in a second end of the regulating plate away from the inclined surface.

14. The ventilation and air conditioning system according to claim 11, wherein the first end of the regulating plate adjacent to the inclined surface is provided with a third groove.

15. A method for regulating an air opening, applicable to a ventilation and air conditioning system that comprises: a housing; a ventilation and air conditioning body; and an air-opening varying component provided at a ventilation outlet of the ventilation and air conditioning body,
wherein the ventilation and air conditioning body comprises a ventilation system and a heat exchanging system, the ventilation system and the heat exchanging system being arranged in the housing, the heat exchanging system comprising a heat exchanging outlet, and the ventilation system comprising a ventilation inlet and the ventilation outlet;
a partition board is provided in the housing and between the ventilation system and the heat exchanging system and separates the ventilation system and the heat exchanging system;
a purification chamber is provided in the ventilation system, and the purification chamber has a first end connected with the ventilation inlet and a second end connected with the ventilation outlet; and
an air inlet duct is arranged between the ventilation inlet and the ventilation outlet; has a first end leading to the ventilation outlet and a second end connected with the purification chamber; penetrates the partition board and extends through the heat exchanging outlet,
wherein the method comprises:

sending, by a controller to a first blower, a request command for requesting a rotation-speed value of the first blower;
in response to the request command, sending, by the first blower, the rotation-speed value to the controller;
determining, by the controller, a size of an air opening of the ventilation outlet according to the rotation-speed value, and sending the air-opening varying component a control command for regulating the size of the air opening; and
regulating, by the air-opening varying component, the size of the air opening of the ventilation outlet according to the control command.

* * * * *